(12) United States Patent  
Yamamoto

(10) Patent No.: US 9,667,874 B2
(45) Date of Patent: May 30, 2017

(54) IMAGING DEVICE AND IMAGE PROCESSING METHOD WITH BOTH AN OPTICAL ZOOM AND A DIGITAL ZOOM

(71) Applicant: Katsuya Yamamoto, Yokohama (JP)

(72) Inventor: Katsuya Yamamoto, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/379,586

(22) PCT Filed: Mar. 15, 2013

(86) PCT No.: PCT/JP2013/058457
§ 371 (c)(1),
(2) Date: Aug. 19, 2014

(87) PCT Pub. No.: WO2013/137489
PCT Pub. Date: Sep. 19, 2013

(65) Prior Publication Data
US 2015/0288887 A1 Oct. 8, 2015

(30) Foreign Application Priority Data
Mar. 16, 2012 (JP) ................. 2012-059804

(51) Int. Cl.
H04N 5/232 (2006.01)
G03B 5/00 (2006.01)
G02B 7/10 (2006.01)

(52) U.S. Cl.
CPC ......... *H04N 5/23296* (2013.01); *G02B 7/102* (2013.01); *G03B 5/00* (2013.01); *G03B 2205/0046* (2013.01)

(58) Field of Classification Search
CPC ....... G03B 5/00; H04N 5/23296; G02B 7/102
(Continued)

(56) References Cited

U.S. PATENT DOCUMENTS

2001/0040630 A1   11/2001   Matsuzaka
2006/0114341 A1*  6/2006   Morinaga ............. H04N 5/232
                                                     348/240.1
(Continued)

FOREIGN PATENT DOCUMENTS

CN   102202168 A   9/2011
JP   03-015808      1/1991
(Continued)

OTHER PUBLICATIONS

International Search Report issued on Apr. 16, 2013 in PCT/JP2013/058457 filed on Mar. 15, 2013.
(Continued)

*Primary Examiner* — Antoinette Spinks
(74) *Attorney, Agent, or Firm* — Oblon, McClelland, Maier & Neustadt, L.L.P.

(57) ABSTRACT

An imaging device includes an optical system including a zoom lens and a focus lens, a driver to drive the zoom lens and the focus lens, an image sensor to convert an optical image of a subject formed via the optical system into an electric signal and output the signal as an image signal, an image processor to generate image data of the subject according to the image signal, a digital zoom element to perform digital zoom on the basis of the image data; and a position detector to detect a position of the zoom lens, wherein the digital zoom element is configured to perform the digital zoom even when the zoom lens position has not reached a telephoto end.

7 Claims, 13 Drawing Sheets

(58) Field of Classification Search
USPC ...................................................... 348/240.1
See application file for complete search history.

(56) References Cited

U.S. PATENT DOCUMENTS

| | | | |
|---|---|---|---|
| 2007/0025713 A1* | 2/2007 | Hosono .................. | G03B 17/12 |
| | | | 396/72 |
| 2008/0060248 A1* | 3/2008 | Pine ......................... | F41G 1/35 |
| | | | 42/114 |
| 2012/0050587 A1 | 3/2012 | Yamamoto | |
| 2012/0229675 A1 | 9/2012 | Yamamoto | |
| 2012/0257072 A1* | 10/2012 | Jirman .................... | G06T 11/00 |
| | | | 348/222.1 |
| 2012/0274780 A1 | 11/2012 | Yamamoto | |

FOREIGN PATENT DOCUMENTS

| | | |
|---|---|---|
| JP | 6-225196 A | 8/1994 |
| JP | 10-042183 | 2/1998 |
| JP | 2004-064674 | 2/2004 |
| JP | 2007-116305 | 5/2007 |
| JP | 2007116305 A * | 5/2007 |
| JP | 2009-224882 | 10/2009 |

OTHER PUBLICATIONS

Japanese Office Action issued Sep. 27, 2016 in Patent Application No. 2012-059804 (without English Translation).
Combined Chinese Office Action and Search Report issued Nov. 16, 2016 in Patent Application No. 201380014458.6 (with English translation).

* cited by examiner

| 35MM EQUIVALENT FOCAL LENGTH [mm] | 28 | 35 | 50 | 85 | 105 | 135 | 200 | 300 |
|---|---|---|---|---|---|---|---|---|
| MINIMUM SUBJECT DISTANCE [cm] | 30 | 33 | 38 | 53 | 59 | 71 | 91 | 143 |

IMAGING DEVICE AND IMAGE PROCESSING METHOD WITH BOTH AN OPTICAL ZOOM AND A DIGITAL ZOOM

CROSS REFERENCE TO RELATED APPLICATION

The present application is based on and claims priority from Japanese Patent Application No. 2012-59804, filed on Mar. 16, 2011, the disclosure of which is hereby incorporated by reference in its entirety.

BACKGROUND OF THE INVENTION

The present invention relates to an imaging device which includes an optical zoom function with, a zoom lens and a digital zoom function by an image processing.

An imaging device such as a compact digital still camera having a simple video shooting is now widespread.

Further, an imaging device with an optical zoom during a video shooting or to perform both an optical zoom and a digital zoom has been increasing. The optical system of such an imaging device often has a minimum object distance of several centimeters at a wide angle and several ten centimeters at telephoto.

Further, a product having a function to change a minimum object distance between a macro mode and a normal shooting mode is available.

If a user starts shooting a subject at a certain distance far from the minimum object distance at a certain angle of view and zooms the subject towards telephoto at an angle of view shorter than the minimum object distance, captured images will be all blurred and out of focus.

In view of the above problem, Japanese Patent Application Publication No. 2009-224882 discloses an imaging device which displays a minimum object distance on a screen and informs a user that a zooming from the minimum object distance to telephoto is unfeasible, for example. However, it cannot meet users' desire for zooming a subject in focus without blurs.

For another example, Japanese Patent Application No. H03-15808 discloses an imaging device which stops optical zoom when a distance between a subject and the device reaches the minimum object distance to avoid out-of-focus situation. However, it cannot meet users' desire for zooming a subject in focus, either.

Meanwhile, in recent years the number of pixels of an image sensor incorporated in a digital still camera has been increased to be larger than that of a high-definition broadcast. Therefore, the use of a virtual zoom or digital zoom by trimming during video shooting is unlikely to degrade visual quality of an image due to insufficient resolution.

Therefore, irrespective of the optical zoom's reaching the telephoto end, the use of both digital zoom and optical zoom from a certain focal length can improve users' convenience since it enables generation of zoomed images in accordance with a photographic situation.

SUMMARY OF THE INVENTION

The present invention aims to provide an imaging device with optical zoom and digital zoom and an image processing method which can perform digital zoom from an arbitrary focal length even when a zoom lens position does not reach a telephoto end.

According to one embodiment, an imaging device includes an optical system including a zoom lens and a focus lens, a driver to drive the zoom lens and the focus lens, an image sensor to convert an optical image of a subject formed via the optical system into an electric signal and output the signal as an image signal, an image processor to generate image data of the subject according to the image signal, a digital zoom element to perform digital zoom on the basis of the image data, and a position detector to detect a position of the zoom lens, wherein the digital zoom element is configured to perform the digital zoom even when the zoom lens position has not reached a telephoto end.

BRIEF DESCRIPTION OF THE DRAWINGS

Features, embodiments, and advantages of the present invention will become apparent from the following detailed description with reference to the accompanying drawings.

DETAILED DESCRIPTION OF EMBODIMENTS

Hereinafter, an imaging device and an image processing method according to embodiments of the present invention will be described in detail with reference to the accompanying drawings. Wherever possible, the same reference numbers will be used throughout the drawings to refer to the same or like parts. The imaging device executes image processing by an image processing method according to one embodiment of the present invention.

Hereinafter, a minimum object distance refers to a distance which a user is allowed to use with the imaging device and is different from that of a lens performance incorporated therein. However, the minimum object distance which the user can use can be equal to the minimum object distance of a lens.

Figure 1:
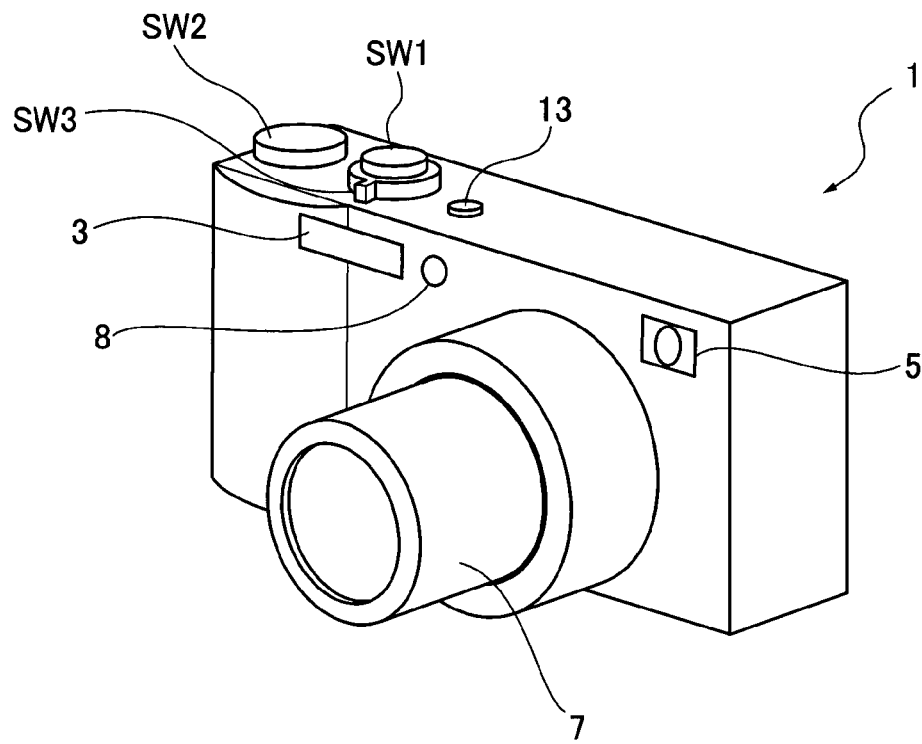
FIG. 1 is a perspective view of the front side of an imaging device according to one embodiment of the present invention.

FIG. 1 is a perspective view of the front side of a digital camera as an example of imaging device. An imaging device 1 includes a camera body of which a shutter button SW1, a mode dial SW2, a zoom lever SW3, and a power switch 13 are provided on a top face. With the mode dial SW2, a user can select a shooting mode from various modes.

The shutter button SW1 is a two-step switch. Upon a half press, an autofocus is performed and upon a full press, an image is shot.

On the front face a stroboscopic unit 3, a ranging system 5, an optical system or lens barrel unit 7, and an auxiliary LED 8 are provided.

The ranging system 5 is a single-focus pan focus lens and has the same view angle as a widest angle of view of the optical system 7. It does not have to drive lenses for focusing so that it can quickly capture an image area.

The optical system 7 is a zoom lens. By a manipulation of the zoom lever SW3 as an optical zoom driver, a zoom motor 71b operates to move a zoom lens 71a to change the angle of view of the imaging device 1.

Figure 2:
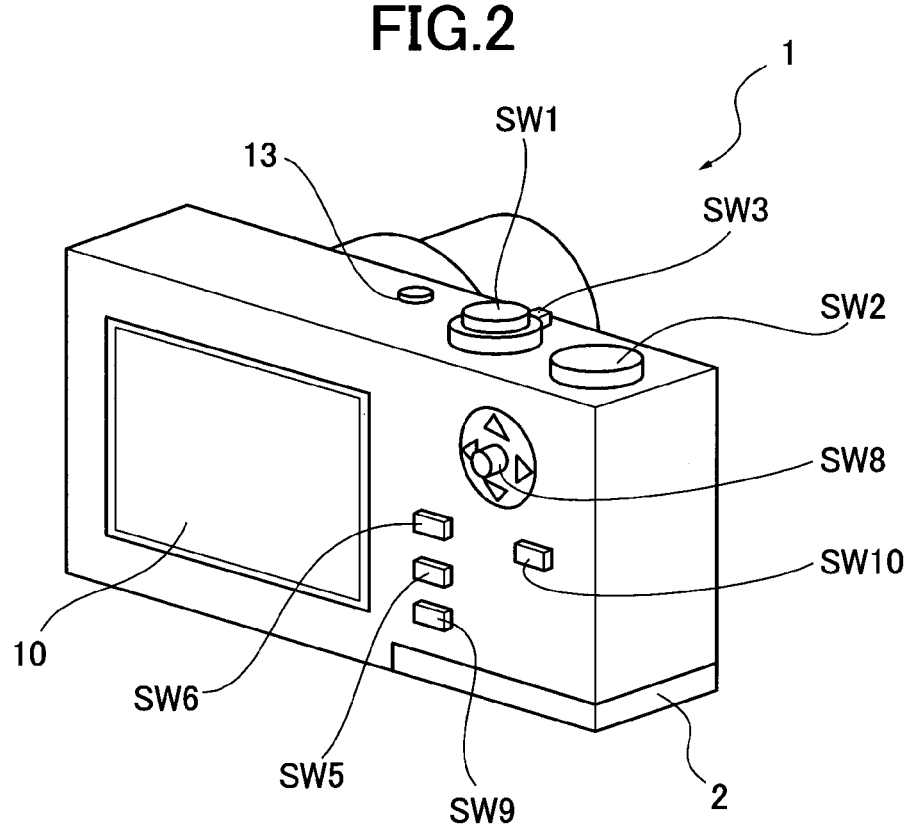
FIG. 2 is a perspective view of the rear side of the imaging device in FIG. 1.

FIG. 2 perceptively shows the back side of the imaging device 1. An LCD 10, a MENU switch SW6, a self-timer/delete switch SW5, a display switch SW9, a reproduction switch SW10, a vertical and horizontal OK switch SW8 are provided.

The LCD 10 as a display displays through images or synthesized images from the optical system 7 or ranging system 5 in shooting operation. It also displays various kinds of shooting information such as a camera mode, aperture value, shutter speed and other various kinds of information for reproducing a captured image, for example.

The vertical and horizontal OK switch SW8 is operated in five different ways, vertically or horizontally inclined upward or downward or pressed.

The imaging device 1 includes an SD card/battery cover 2 to contain an SD card and batteries.

Figure 3:
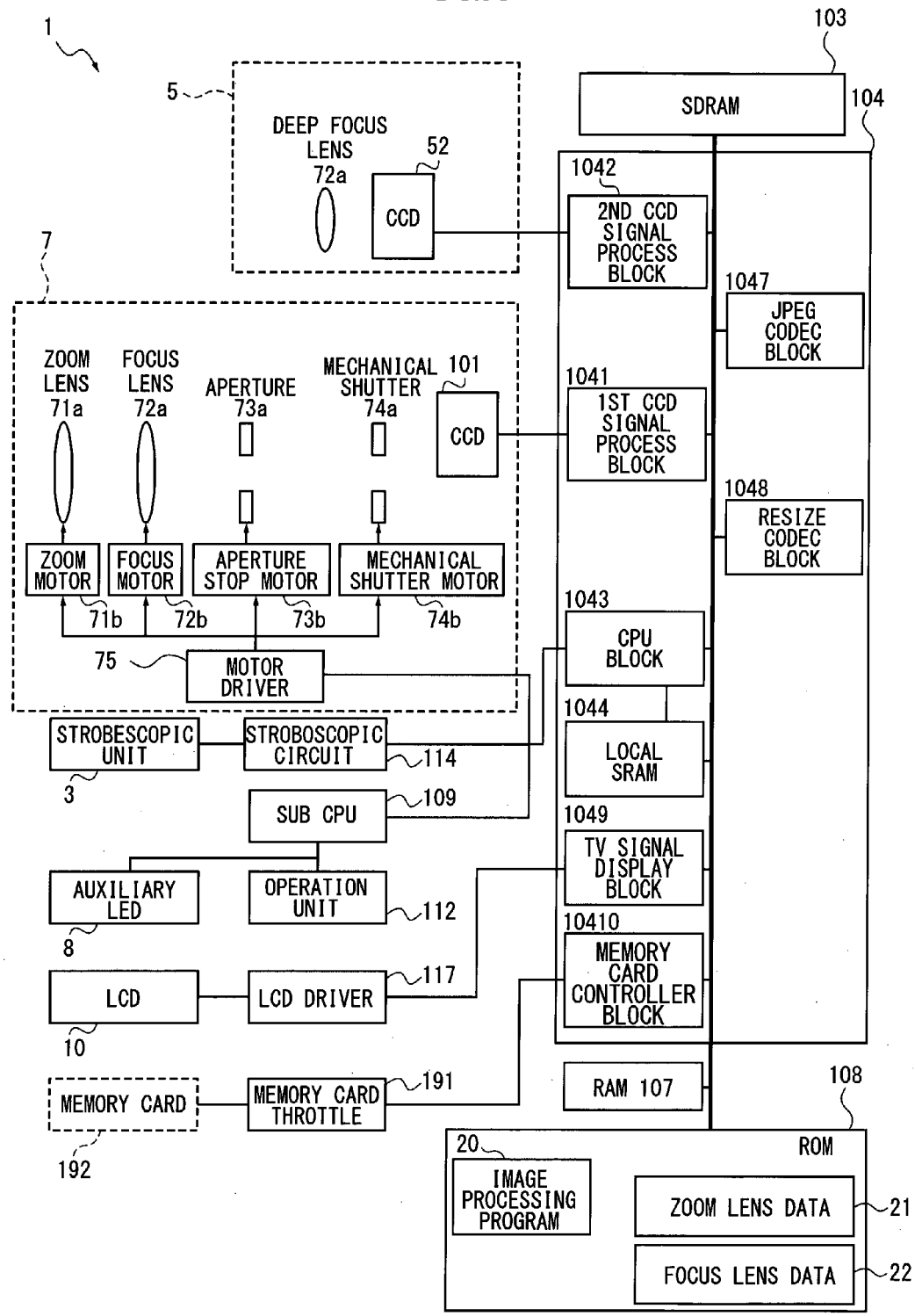
FIG. 3 is a block diagram of the control system of the imaging device.

FIG. 3 is a block diagram of the control system of the imaging device 1. In the following the elements necessary for the image processing according to one embodiment are only described and a description on the elements of a general digital camera is omitted.

A variety of operations of the imaging device 1 are controlled by an imaging program and a processor 104 comprised of a digital signal processing integrated circuit.

The processor 104 includes a first CCD signal process block 1041 for the optical system 7, a second CCD signal process block 1042 for the ranging system 5, a CPU block 1043, a local SRAM 1044, a JPEG codec block 1047, a resize codec block 1048, a TV signal display block 1049, and a memory card controller block 10410. These elements are connected via a bus line.

The CPU block 1043 functions to set white balance and gamma on the output data from an image sensor 101 of the optical system 7 and an image sensor 52 of the raging system 5 and control the elements of the imaging device 1.

The local SRAM 1044 is a memory in which control data are temporarily stored.

The resize codec block 1048 as a digital zoom element cuts out or resize the output data from the image sensor 101 to create digital zoom images.

The TV signal display block 1049 converts image data into a video signal for display on the LCD 10 or an external display as TV.

An SDRAM 103 as a frame memory to store RAW-RGB data, YUV image data and JPEG image data, a RAM 107, a ROM 108 containing control programs are provided outside the processor 104 and they are connected via a bus line. The SDRAM 103 is a frame memory.

The control programs in the ROM 108 includes an image processing program 20 to cause the processor 104 to execute the image processing.

Figures 4, 5:
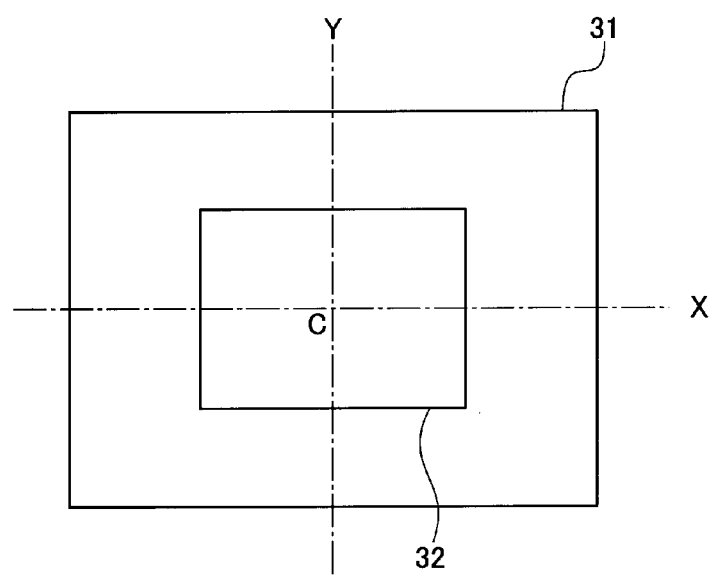
FIG. 4 shows an example of specific data on a relation between zoom lens position and minimum object distance.
FIG. 5 is a conceptual diagram of a digital zoom processing of the imaging device.

The ROM 108 as a memory contains zoom lens data 21 indicating a relation between a zoom lens position and a minimum object distance, as shown in FIG. 4 for example. The zoom lens data 21 can be a parameter of a formula representing a relation between the zoom lens and minimum object distance.

The ROM 108 also contains focus lens data 22 indicating a relation between a focus lens position and a subject distance. The data can be a parameter of a formula.

In the imaging device 1, the processor 104 executes an image processing program 20, referring to the zoom lens data 21 and the focus lens data 22 in ROM 108. The image processing program 20 realizes the functions of a distance acquiring element, an image processor, and a comparator.

The processor 104 is a computer connected with the CPU block 1043 via the bus line and the CPU block 1043 performs the following image processing on image data by the image processing program 20.

The image processing program 20 is read into the ROM 108 from a memory card 192 via a memory card throttle 191. Alternatively, it can be downloaded on the ROM 108 via a not-shown network.

The LCD driver 117 also functions to convert video signals from the TV signal display block 1049 into signals for the display on the LCD 10.

On the LCD 10 a user can monitor a subject before shooting, check a captured image, and view image data stored in the memory card 192.

The optical system 7 includes a zoom system as an optical zoom element with a zoom lens 71a and a zoom motor 71b, a focus system with a focus lens 72a and a focus motor 72b, a diaphragm unit with a diaphragm 73a and a diaphragm motor 73b, a mechanical shutter unit having mechanical shutter 74a and a motor 74b, a motor driver 75, and the image sensor 101 as CCD.

The zoom motor 71b and focus motor 72b as a driver are stepping motors to function as a position detector to detect a lens position from a motor rotation angle. Alternatively, they can be DC motors with a shaft including an encoder to acquire a motor rotation angle.

The ranging system 5 includes a single-focus, deep focus lens 51 and the image sensor 52.

Next, an autofocus using the image data from the ranging system 5 is described. Upon a press to the shutter button SW1, digital RGB image data are captured into the second CCD signal process block 1042 to calculate an AF evaluation value indicating the level of focus in a part of a frame and an AE evaluation value indicating the level of exposure. The AF evaluation value is sent to the CPU block 1043 and also used in autofocus processing as feature data.

The edge portions of a subject in focus is sharp and clear so that image data thereof contains the highest frequency components of a spatial frequency. For example, in hill climb autofocus, the AF evaluation value is set to a value representing a degree of high frequency components such as a derivative value relative to a change amount.

In autofocus the position of the focus lens 72a at which the image data with a maximal AF evaluation value is acquired is set to a focus position. In hill climb AF the focus position can be determined by detecting a peak of the AF evaluation value. The AF evaluation value is acquired at a certain timing or position while the focus lens 72a is moved to determine a focus state or focus position from the acquired value.

A drive amount of the focus lens 72a is set by the motor driver 75 according to a single VD signal and it is equivalent to the number of drive pulses when the focus motor 72b is a pulse motor, for example.

The focus lens 72a is driven in accordance with a falling of a pulse of the VD signal at a certain pulse rate by a certain number of drive pulses. The motor driver 75 drives the focus lens 72a in synchronization with the VD signal, that is, frame cycle.

Next, the digital zoom of the imaging device 1 is described. FIG. 5 is a conceptual view of the digital zoom. In the drawing the periphery of pre-processed image data 31 before digital zoom is cut off with the center C maintained to generate post-processed image data 32 after digital zoom.

In digital zoom, for example, at 35 mm equivalent angle of view of 28 mm the periphery of image data is removed so that each side is reduced to a half. The angle of view of the image data is now 56 mm (28*2). Then, by enlarging each side of the cut-off data to that of the pre-processed image data 31, the post-processed image data 32 twice as enlarged is created.

First Embodiment

Next, a first embodiment of an image processing method is described. Note that in the following the angle of view of an optical zoom is set to a 35 mm equivalent value.

The first embodiment describes an example where a user zooms a subject to a telephoto end or in a direction in which the minimum object distance is increased. In the first embodiment, at the minimum object distance longer than a subject distance, optical zoom is switched to digital zoom even if the optical zoom position has not reached a telephoto end.

Figure 6:
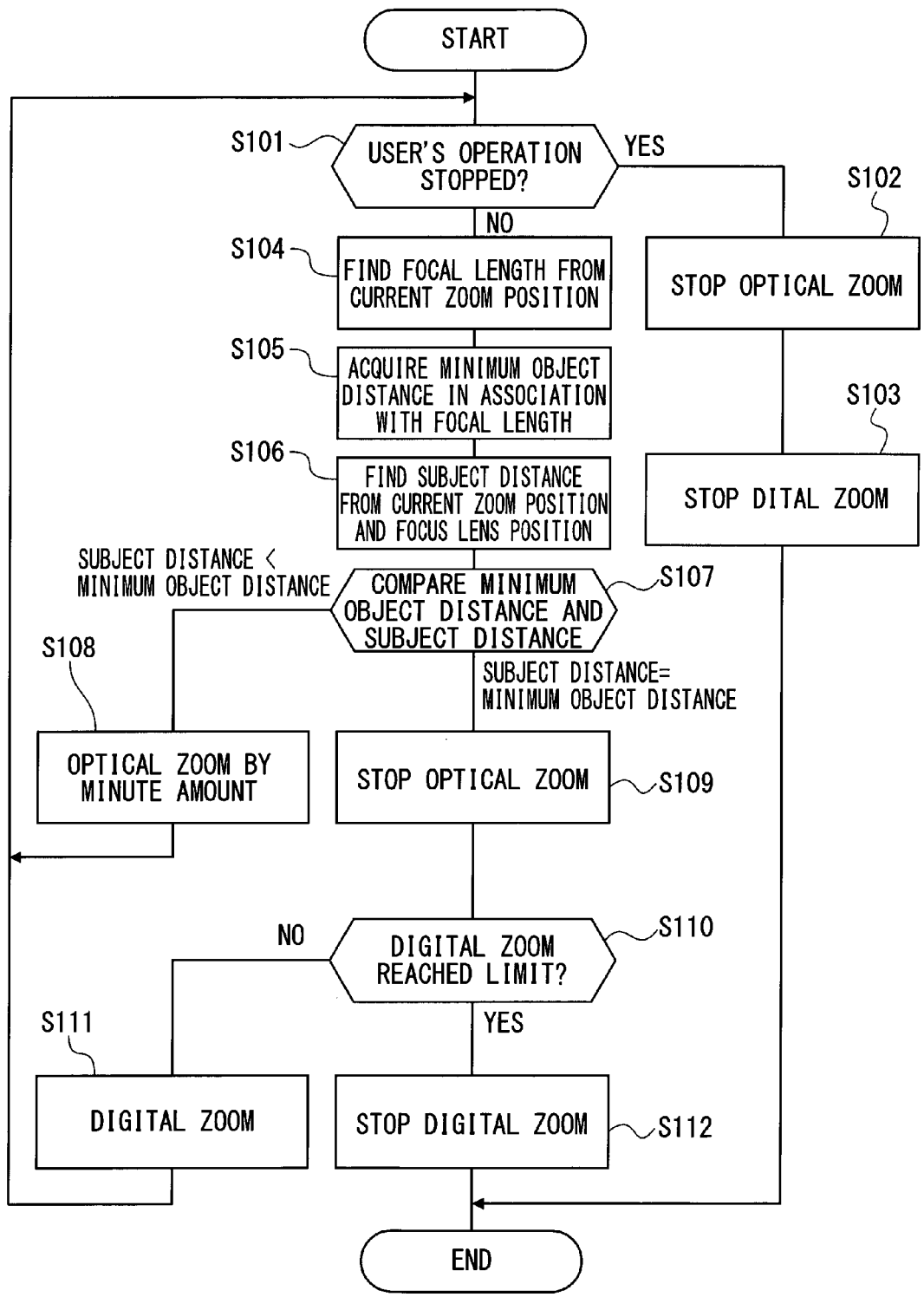
FIG. 6 is a flowchart for switching between optical zoom and digital zoom towards telephoto in the imaging device.

Referring to FIG. 6, a switching between the optical zoom and digital zoom of the imaging device 1 is described.

In step S101 the CPU block 1043 acquires information from a sub CPU 109 to determine whether or not a user operates the zoom lever SW3 towards telephoto. When the user stops operating the zoom lever SW3 (YES in step S101), the CPU block 1043 instructs the zoom motor 71b via the motor driver 75 to stop the optical zoom in step S102 and instructs the resize codec block 1048 to stop the digital zoom in step S103. Then, it ends the operation.

While the user is operating the zoom lever SW3 (NO in step S101), the CPU block 1043 acquires a current zoom lens position from the rotation angle of the zoom motor 71b or counts of an encoder and calculates a focal length at the current zoom lens position in step S104.

In step S105 the CPU block 1043 acquires a minimum object distance corresponding to the calculated focal length from the ROM 108.

In step S106 the CPU block 1043 acquires current zoom lens position and focus lens position to calculate a subject distance. The focus lens 72a can be determined to be at the focus position if it is in a position where wobbling is performed. Wobbling refers to an operation in which the focus lens 72a is gradually vibrated along the optical axis to a focus position.

The subject distance can be determined from the angle of view and lens position with a peak of the AF evaluation value set by wobbling.

In step S107 the CPU block 1043 compares the minimum object distance acquired in step S105 and the subject distance acquired in step S106. When the subject distance is longer than the minimum object distance, the CPU block 1043 determines that the optical zoom is feasible and allows the zoom motor 71b to perform optical zoom by a minute amount in step S108. Then, the CPU block 1043 returns to step S101.

Meanwhile, when the subject distance has reached the minimum object distance, the CPU block 1043 instructs the zoom motor 71b to stop the optical zoom and the resize codec block 1048 to start the digital zoom in step S109.

In step S110 the CPU block 1043 determines whether or not the digital zoom has reached a maximal allowable magnification or a digital zoom limit. With No in step S110, it instructs the resize codec block 1048 to enlarge the digital zoom by a minute magnification in step S111. Then, the CPU block 1043 returns to S101.

With YES in step S110, the CPU block 1043 instructs the resize codec block 1048 to complete the digital zoom in step S112, ending the operation.

Figure 7:
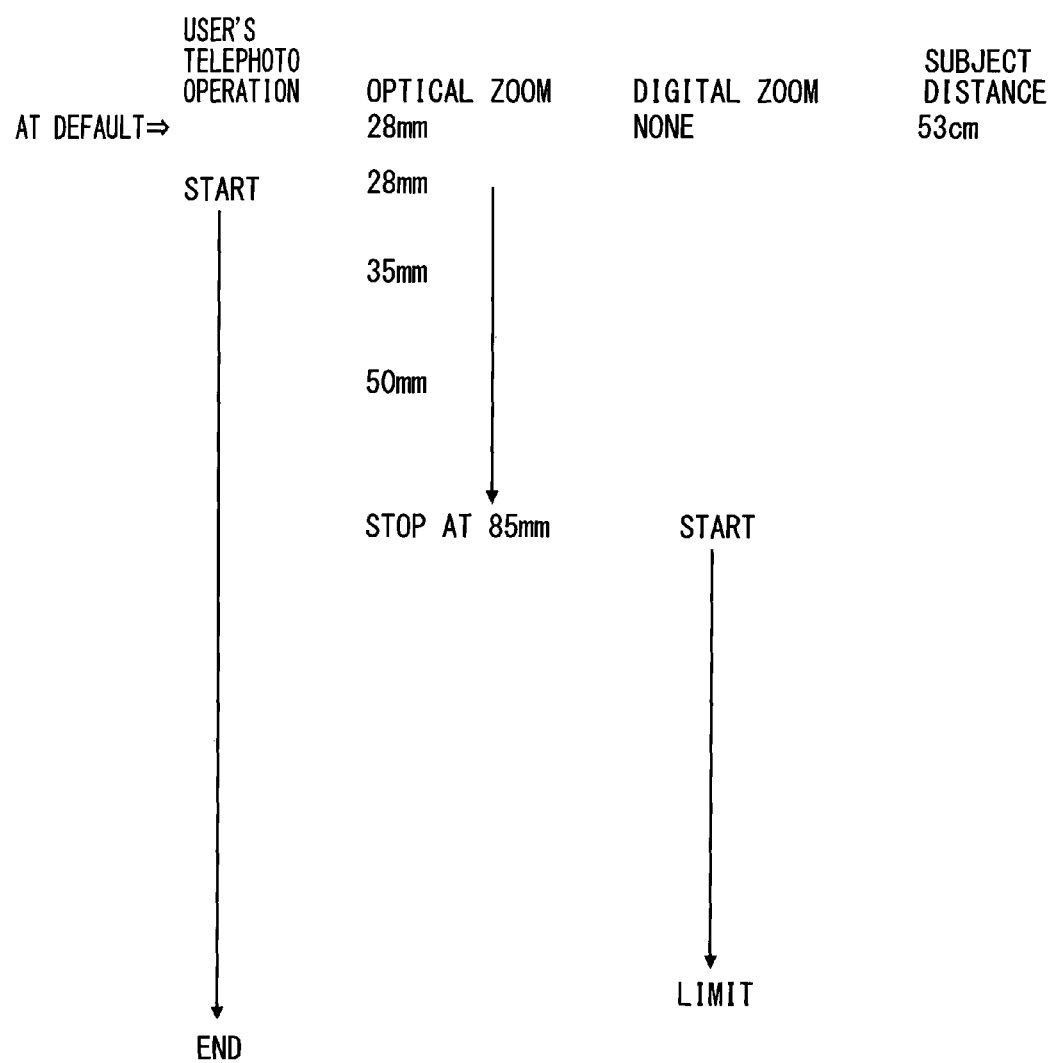
FIG. 7 shows a sequence of the switching between optical zoom and digital zoom towards telephoto by way of example.

FIG. 7 shows a sequence of the switching between the optical zoom and digital zoom towards telephoto end by way of example. In FIG. 7 the imaging device 1 is set at the widest angle at default in the optical zoom (equivalent to 28 mm) and digital zoom. Also, it is set at a subject distance of 53 cm, that is, from the zoom lens data 21, focusing is feasible till an angle of view equivalent to 85 mm when the subject distance matches the minimum object distance.

In this positional relation between the imaging device 1 and a subject, the imaging device 1 performs the optical zoom till the 35 mm equivalent focal length of 85 mm (steps S101, S104 to S108).

If a user is continuing zooming after the focal length of 85 mm, the imaging device 1 switches it to the digital zoom (step S109 to S111) to enlarge the appearance of image data.

Figure 8:
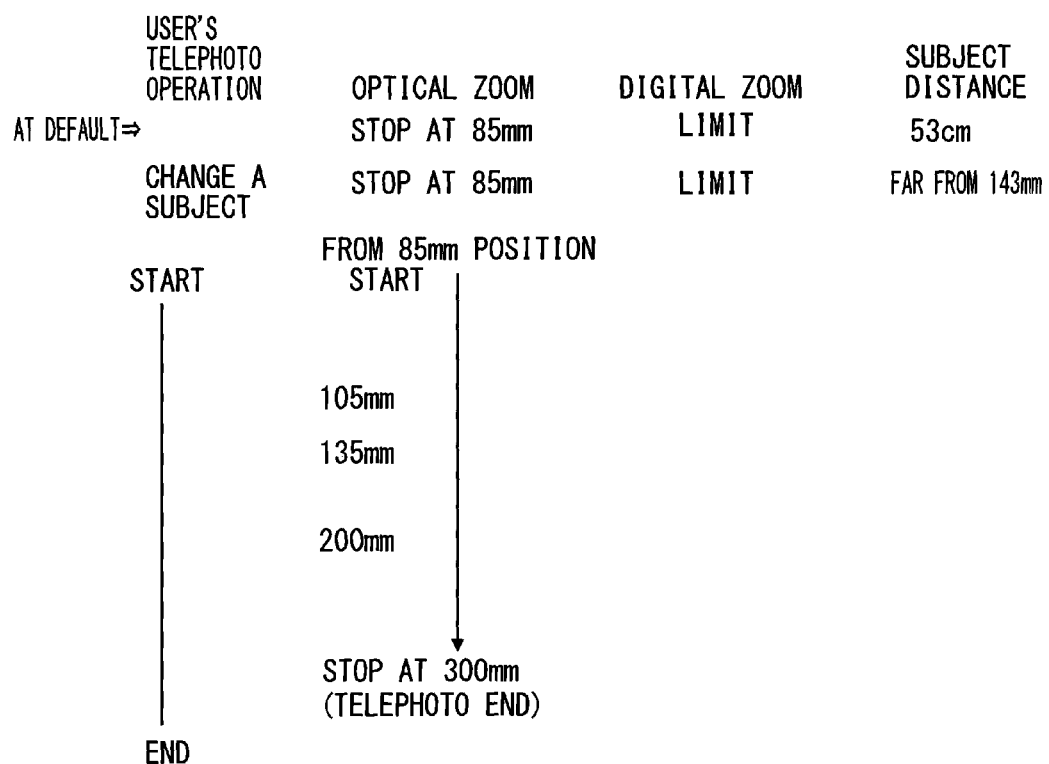
FIG. 8 shows another example of a sequence of the switching between optical zoom and digital zoom towards telephoto.

FIG. 8 shows another example of a sequence of the switching of the optical zoom and digital zoom towards the telephoto end. At default the imaging device 1 has ended the operation in FIG. 7, the optical zoom is positioned at the 35 mm equivalent focal length of 85 mm, and the digital zoom has reached the maximal allowable magnification. A subject distance is initially 53 cm.

Then, the subject distance is changed to 143 cm or more due to a change of a subject, for example. If a user starts zooming towards telephoto, the CPU block 1043 determines that the optical zoom is feasible referring to the zoom lens data 21 and instructs the zoom motor 71b to operate (in steps S101, S104 to S108). Thus, a subject is further enlarged.

As described above, the imaging device includes the optical system including the zoom lens 71a and the focus lens 72a, the zoom motor 71b and focus motor 72b to drive the zoom lens 71a and the focus lens 72a, the image sensor 101 to convert an optical image of a subject formed via the optical system into an electric signal and output the signal as an image signal, the image processor 104 to generate image data of the subject according to the image signal, the resize codec block 10148 to perform digital zoom on the basis of the image data, and a position detector to detect a position of the zoom lens 71a.

Thus, the resize codec block 1048 as a digital zoom element performs digital zoom even if the position of the zoom lens 71a has not reached the telephoto end. That is, when the zoom lens 71a continues zooming and the minimum object distance becomes longer than the subject distance, for example, the imaging device 1 performs the digital zoom to enlarge image data even before the telephoto end.

Further, the imaging device 1 can perform digital zoom from an arbitrary 35 mm equivalent focal length even when the zoom lens 71a has not reached the telephoto end, and can optimally enlarge image data in accordance with a photographic scene.

Further, the minimum object distance in accordance with the zoom lens position is stored in the ROM 108. The processor 104 functions to acquire the distance to a subject in focus, drive the zoom lens to perform the optical zoom, and compare the minimum object distance with the subject distance and determine whether or not the subject distance has reached the minimum object distance.

Further, upon receiving an instruction to perform optical telephoto zoom, the resize codec block 1048 performs digital zoom when the subject distance has reached the minimum object distance. The imaging device 1 is configured to switch the optical zoom to the digital zoom by comparing the minimum object distance and subject distance in accordance with a zoom lens position. Accordingly, a user can use zooming function smoothly without knowing the minimum object distance of the optical zoom.

Further, image data can be a preview image during still image shooting or a video image during video shooting. The image processing method is applicable to both still images and video images.

Second Embodiment

Next, a second embodiment of the image processing method is described. The second embodiment describes a zooming operation where a user is zooming to a wide angle in which the minimum object distance is decreased.

Figure 9:
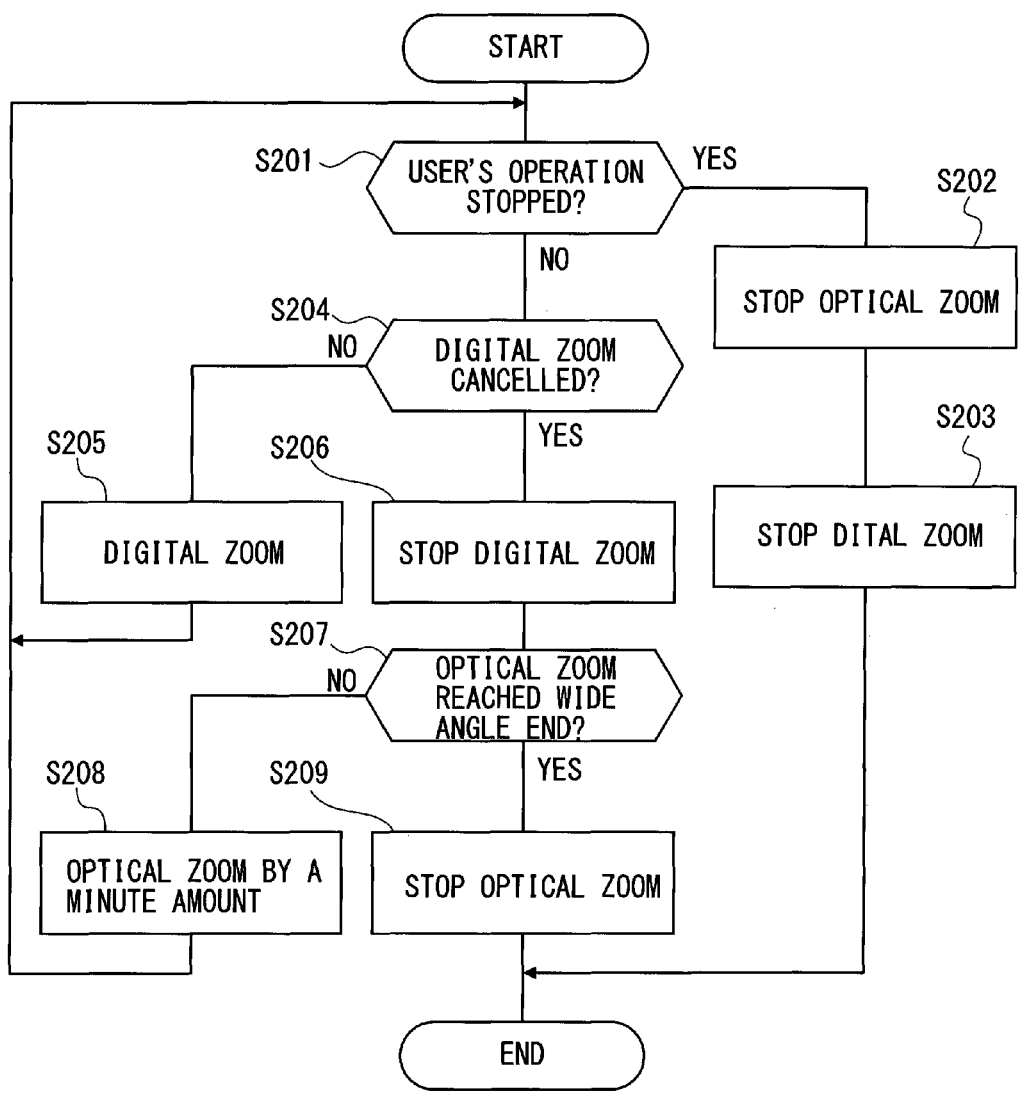
FIG. 9 is a flowchart for switching between optical zoom and digital zoom towards a wide angle.

FIG. 9 is a flowchart for switching between the optical zoom and digital zoom to a wide angle in the image processing method. In this switching the magnification of digital zoom is reduced first, then the digital zoom is canceled, and the zoom lens 71a is moved to a wide angle end.

The CPU block 1043 determines whether or not a user manipulates the zoom lever SW3 from data from the sub CPU 109 in step S201. When the user's manipulation stops (YES in step S201), the CPU block 1043 instructs the zoom motor 71b via the motor driver 75 to stop the optical zoom in step S202. Also, it instructs the resize codec block 1048 to stop digital zoom in step S203, ending the operation.

While the user is operating the zoom lever SW3 towards a wide angle (NO in step S201), the CPU block 1043 determines whether or not the magnification of image data to a wide-angle end is reduced and the digital zoom is cancelled in step S204.

If the digital zoom is not cancelled (NO in step S204), the CPU block 1043 instructs the resize codec block 1048 to reduce the digital zoom at a minute rate. Then, it returns to step S201.

Meanwhile, if the digital zoom is canceled, the CPU block 1043 instructs the resize codec block 1048 to stop the digital zoom in step S206.

In step S207 the CPU block 1043 determines from the rotation angle of the zoom motor 71b whether or not the optical zoom position has reached the wide-angle end. When it has not reached the wide-angle end (NO in step S207), the CPU block 1043 instructs the zoom motor 71b to move the zoom lens 71a by a minute amount in step S208, and then returns to step S201.

When it has reached the wide-angle end (YES in step S207), the CPU block 1043 instructs the zoom motor 71b to stop the zoom lens 71a in step S209, ending the operation.

Figure 10:
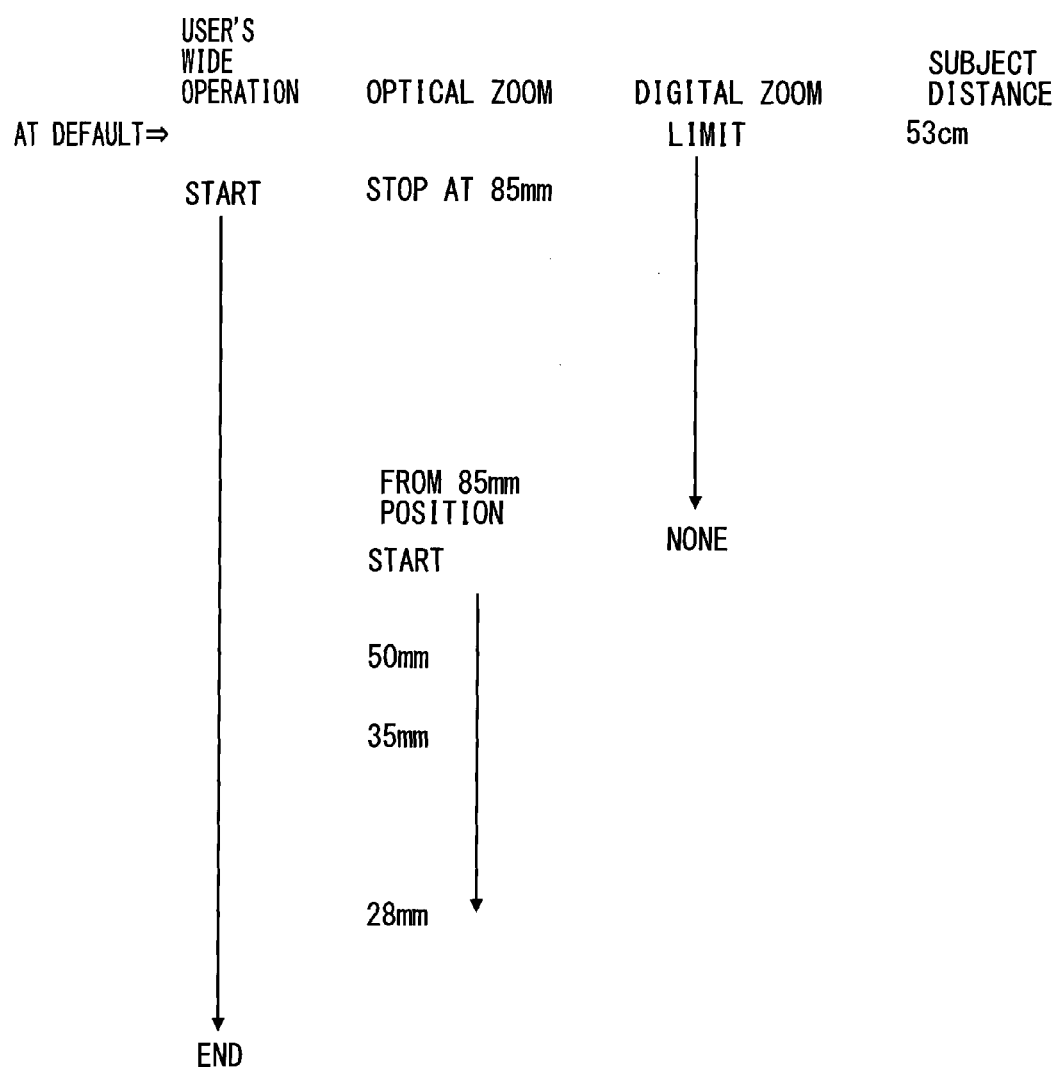
FIG. 10 shows a sequence of the switching between optical zoom and digital zoom towards a wide angle by way of example.

FIG. 10 shows an example of sequence of switching between the optical zoom and digital zoom towards the wide-angle end. At default the imaging device 1 has ended the operation in FIG. 7, the optical zoom is positioned at the 35 mm equivalent focal length of 85 mm, and the digital zoom has reached the maximal allowable magnification. A subject distance is initially 53 cm.

When the user operates the zoom lever SW3 to a wide angle, the CPU block 1043 instructs the resize codec block 1048 to reduce the magnification of the digital zoom and cancel the digital zoom (steps S201 to S206).

When the digital zoom is stopped but the user continues zooming towards wide, the CPU block 1043 operates the zoom motor 71b to move the zoom lens 71a to the wide-angle end (steps S207 to S209).

Figure 11:
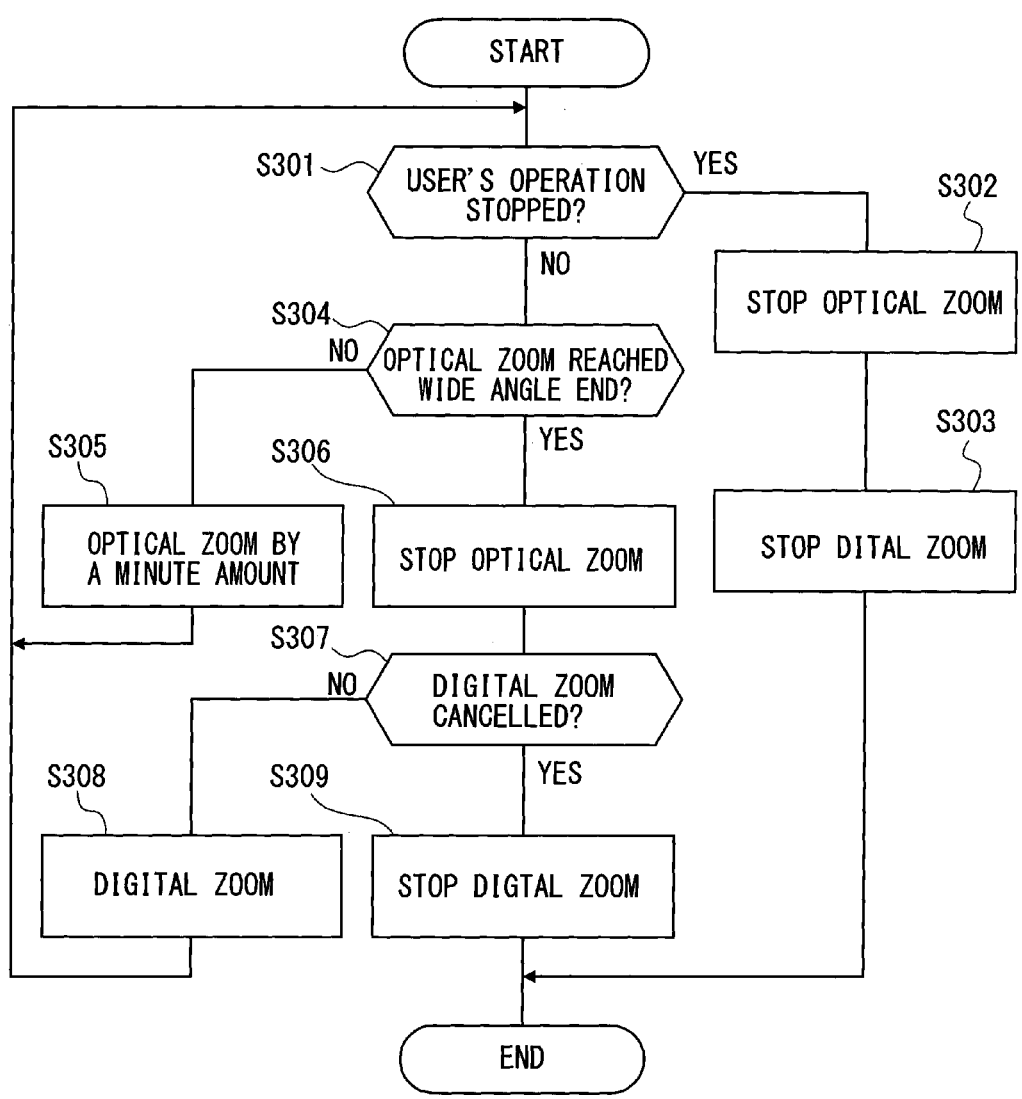
FIG. 11 is a flowchart for another example of the switching between optical zoom and digital zoom towards a wide angle.

FIG. 11 is another example of the switching between the optical zoom and digital zoom to a wide angle. In this switching the zoom lens 71a is moved to the wide-angle end, then the magnification of the digital zoom is reduced, and the digital zoom is cancelled.

The CPU block 1043 determines from the data from the sub CPU 109 whether or not the user is manipulating the zoom lever SW3 towards a wide angle in step S301. When the user's manipulation has stopped (YES in step S301), the CPU block 1043 instructs the zoom motor 71b via the motor driver 75 to stop the optical zoom in step S302, and the resize codec block 1048 to stop the digital zoom in step S303, ending the operation.

While the user is operating the zoom lever SW3 (NO in step S301), the CPU block 1043 determines from the rotation angle of the zoom motor 71b whether or not the zoom lens position has reached the wide-angle end in step S304.

When the zoom lens 71a has reached the wide-angle end (NO in step S304), the CPU block 1043 instructs the zoom motor 71b to move the zoom lens 71a by a minute amount in step S305. Then, the CPU block 1043 returns to step S301.

When the zoom lens 71a has reached the wide-angle end (YES in step S305), the CPU block 1043 instructs the zoom motor 71b to stop the optical zoom in step S306.

In step S307 the CPU block 1043 determines whether or not the magnification of the digital zoom to a wide angle is reduced or cancelled. With the digital zoom not cancelled (NO in step S307), the CPU block 1043 instructs the resize codec block 1048 to reduce the digital zoom at a minute rate in step S308 and returns to step S301.

With the digital zoom cancelled (Yes in step S307), the CPU block 1043 instructs the resize codec block 1048 to stop the digital zoom in step S309.

Figure 12:
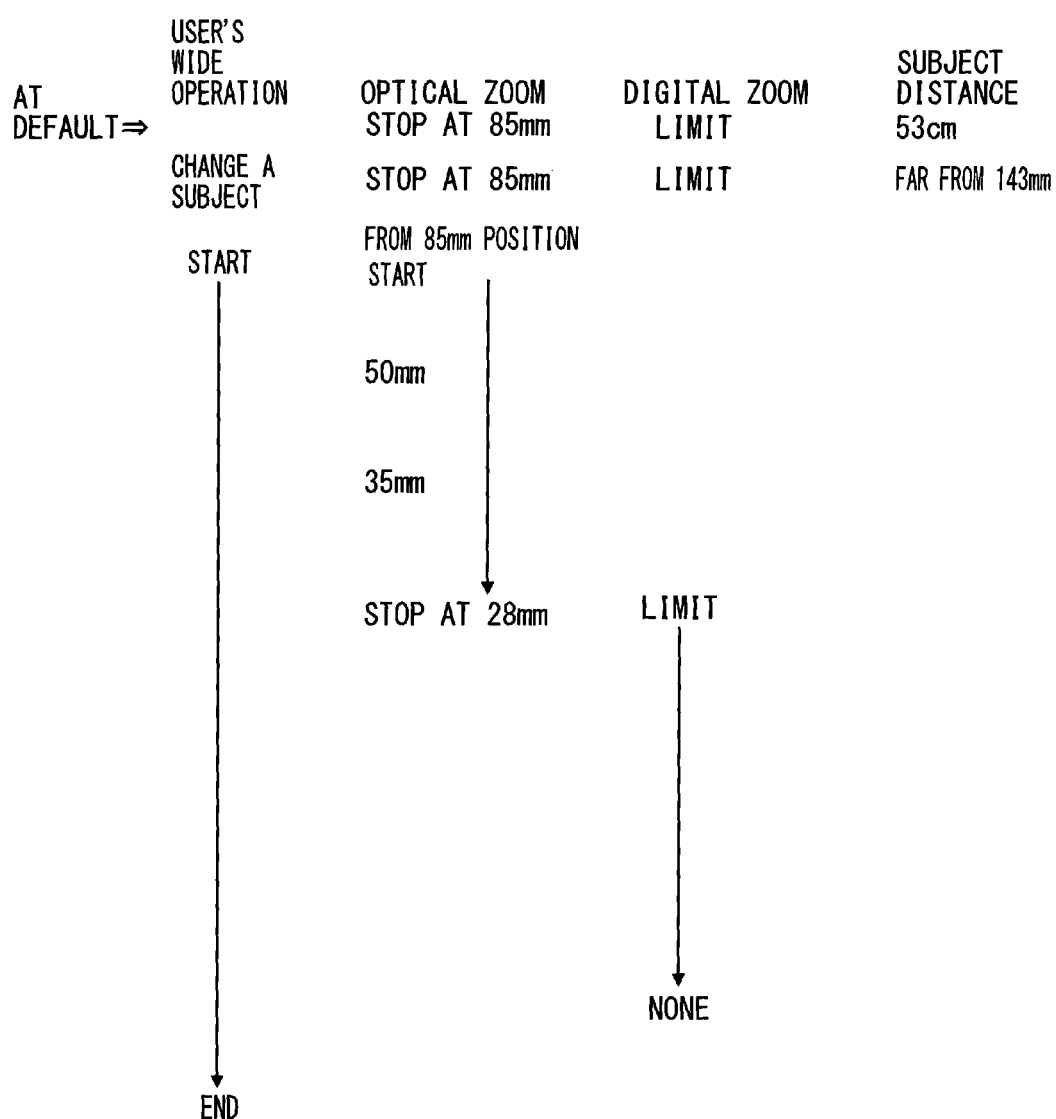
FIG. 12 shows another example of the switching between optical zoom and digital zoom towards a wide angle by way of example.

FIG. 12 shows another example of the sequence of switching between the optical zoom and digital zoom to a wide angle. In the drawing at default the imaging device 1 has ended the operation in FIG. 7, the optical zoom is positioned at the 35 mm equivalent focal length of 85 mm, and the digital zoom has reached the maximal allowable magnification. A subject distance is initially 53 cm.

If the subject distance is changed to 143 cm or more due to a change in a subject and the user operates the zoom lever SW3 to a wide angle end, the CPU block 1043 instructs the zoom motor 71b first to move the zoom lens 71a to a wide angle on the basis of the relation between the subject distance and minimum object distance (steps S301 to S306).

If the user continues zooming to a wide angle after the zoom lens 71a is moved to the wide-angle end, the CPU block 1043 reduces the magnification of the digital zoom and changes the angle of view until the digital zoom is cancelled (steps S307 to S309).

The above-described sequence is also applicable when the subject distance is changed to decrease.

The second embodiment has described an example where an instruction to perform optical zoom to a wide angle is issued by the manipulation of the zoom lever SW3 when the optical zoom and digital zoom are both positioned at telephoto. According to the imaging device 1 the resize codec block 1048 performs digital zoom towards a wide angle and the zoom motor 71b performs optical zoom towards a wide angle. Thus, the imaging device 1 can generate high-quality image data in zooming by reducing or cancelling the digital zoom before the resolution of image data is degraded.

Further, the resize codec block 1048 performs digital zoom towards a wide angle after the zoom motor 71b moves the zoom lens 71a thereto. Because of this, the imaging device 1 can generate high-quality image data in zooming by cancelling the digital zoom after the optical zoom is set to a wide angle.

Third Embodiment

Figure 13:
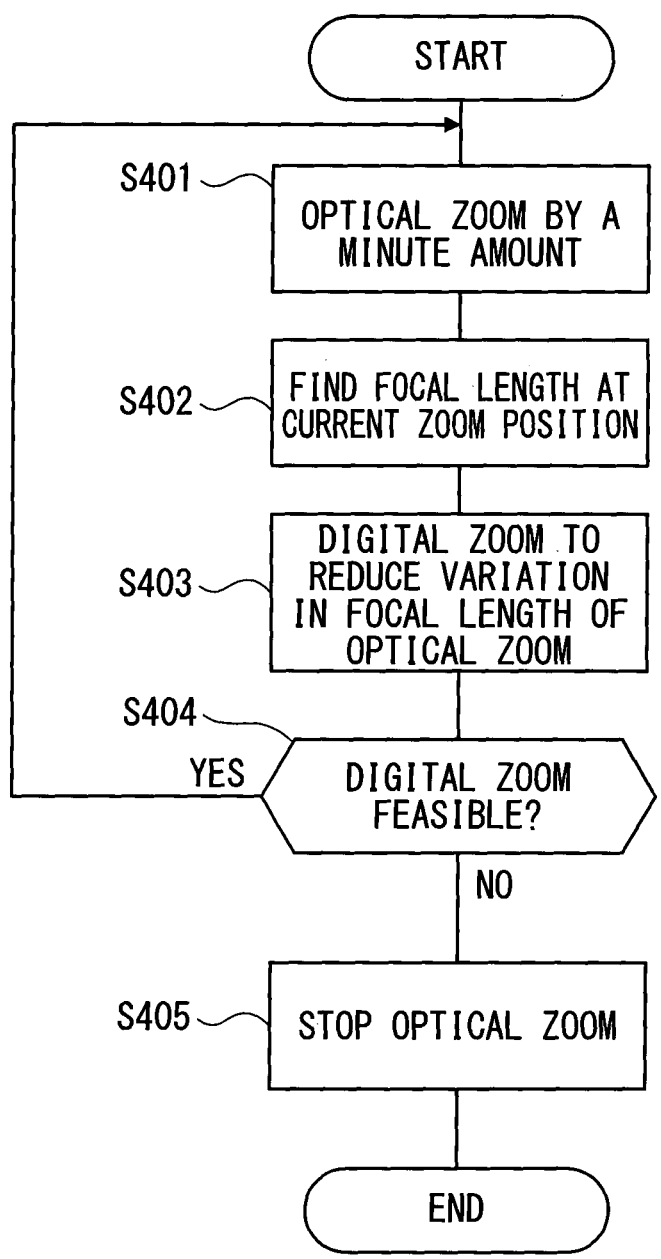
FIG. 13 is a flowchart for performing both the optical zoom and the digital zoom to reduce a variation in the angle of view.

A third embodiment of the image processing method is now described. The third embodiment describes an example of the use of both the optical zoom and digital zoom to reduce a variation in the angle of view in accordance with the subject distance and minimum object distance and change a zooming state. This aims to prevent a user to take notice of the variation in the angle of view while viewing image data on the display. FIG. 13 is a flowchart for performing both the optical zoom and digital zoom in view of reducing a change in the angle of view.

In step S401 the CPU block 1043 instructs the zoom motor 71b to move the zoom lens 71a by a minute amount towards either telephoto or a wide angle.

In step S402 the CPU block 1043 acquires zoom lens data 21 and the current position of the zoom lens 71a from the rotation angle of the zoom motor 71b and counts of an encoder to find a focal length at the current zoom lens position.

In step S403 the CPU block 1043 instructs the resize codec block 1048 to perform digital zoom to reduce a variation in the focal length or the angle of view due to the optical zoom.

In step S404 the CPU block 1043 determines whether or not the digital zoom can be further reduced or increased. When the digital zoom is feasible (YES in step S404), the CPU block 1043 returns to step S401. When the digital zoom is not feasible (NO in step S404), the CPU block 1043 instructs the zoom motor 71b to stop the optical zoom in step S405, ending the operation.

Figure 14:
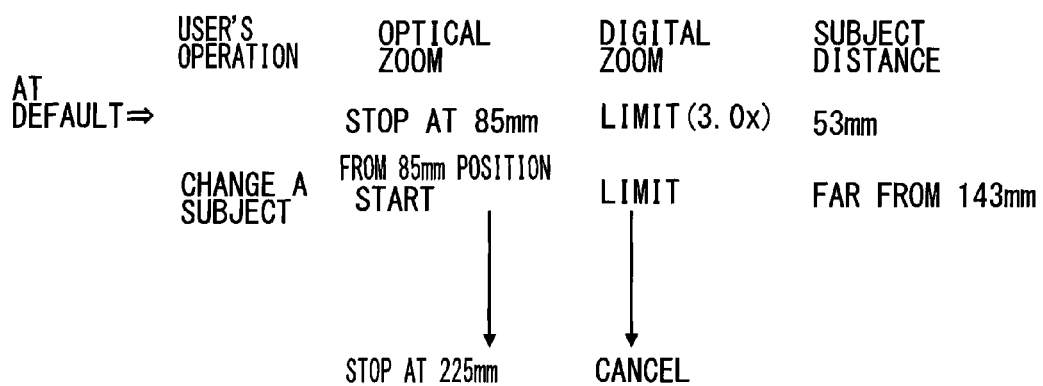
FIG. 14 shows a sequence of performing both the optical zoom and the digital zoom to reduce a variation in the angle of view by way of example.

FIG. 14 shows an example of sequence of the optical zoom and digital zoom to reduce a variation in the angle of view. At default the imaging device 1 has ended the operation in FIG. 7, the optical zoom is positioned at the 35 mm equivalent focal length of 85 mm, and the digital zoom has reached the maximal allowable magnification of 3.0×. A subject distance is initially 53 cm.

If a subject distance is changed to 143 cm or more due to a change of a subject, and a certain length of time has passed without a user's manipulation, the CPU block 1043 instructs the zoom motor 71b to drive the zoom lens 71a to telephoto and at the same time instructs the resize codec block 1048 to reduce the magnification of the digital zoom or cancel it (steps S401 to S404).

Here, although moving the optical zoom towards telephoto narrows the viewing field while reducing the magnification of the digital zoom widens it, the CPU block 1043 coordinates both the optical zoom and digital zoom to reduce a change in the viewing field, so as not to allow a user to recognize the change, viewing the LCD 10.

Before the above operation, the 35 mm equivalent focal length is 85 mm and the digital zoom is 3.0× so that the apparent angle of view is 255 mm. To prevent a change in the apparent angle of view, the imaging device 1 stops operating when the optical zoom is at 255 mm and the digital zoom is cancelled.

Figure 15:
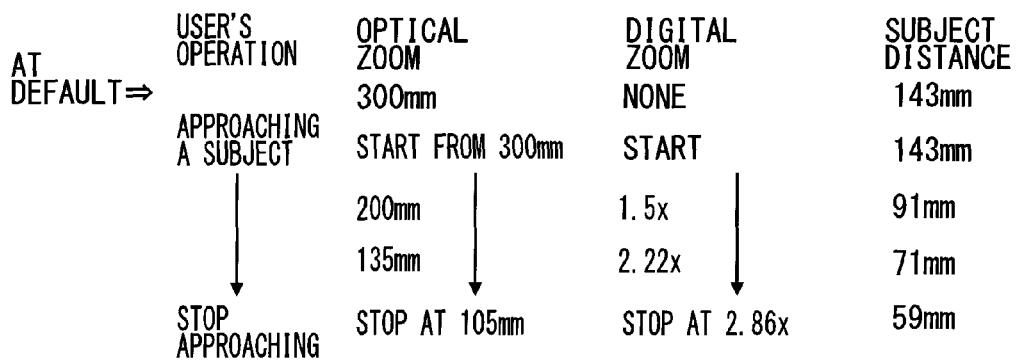
FIG. 15 shows another example of performing both the optical zoom and digital zoom to reduce a variation in the angle of view.

FIG. 15 shows another example of sequence of the optical zoom and digital zoom to reduce a variation in the angle of view. At default the optical zoom is at 35 mm equivalent focal length of 300 mm and the digital zoom is not used. A subject distance is 143 cm.

Then, when the user moves the imaging device 1 closer to a subject from the default position, the CPU block 1043 operates the zoom motor 71b to move the zoom lens 71a to a wide angle so that the subject distance and minimum object distance coincide with each other. Concurrently, the CPU block 1043 instructs the resize codec block 1048 to perform digital zoom in synchronization with a variation in the optical zoom (steps S401 to S404).

The CPU block 1043 widens the viewing field by moving the optical zoom to a wide angle and allows the resize codec block 1048 to increase the magnification of the digital zoom. Thereby, it can negate a variation in the viewing field.

It continues the above operation with the angle of view maintained until the subject distance reaches the minimum object distance.

As described above, the imaging device 1 is configured to perform both the optical zoom and digital zoom to prevent a change in the angle of view of image data on the LCD 10 if there is a change in the subject distance acquired by the processor 104. The imaging device 1 can prevent a change in the apparent angle of view on the display and optimally maintain the levels of the optical zoom and digital zoom in accordance with the subject distance.

With an increase in the subject distance, the zoom motor 71b performs optical zoom until the subject distance reaches the minimum object distance, upon receiving an instruction for the optical telephoto zoom.

Fourth Embodiment

Figure 16:
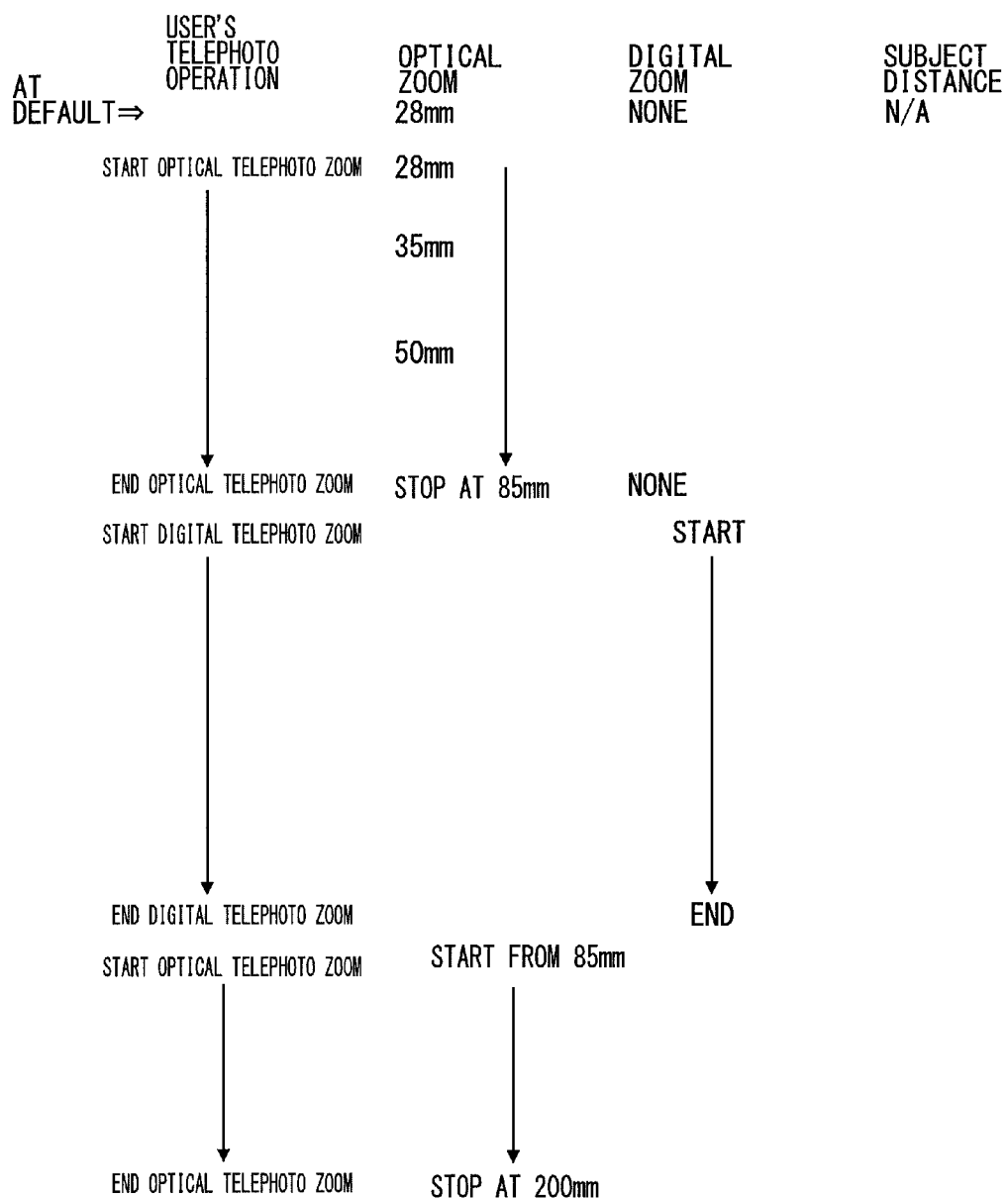
FIG. 16 shows a sequence of individually performing the optical zoom and digital zoom at an arbitrary ratio by way of example.

Now, a fourth embodiment of the image processing method is described. The fourth embodiment describes an example of a manual operation mode in which the optical zoom and digital zoom can be performed individually and at an arbitrary ratio. FIG. 16 shows an example of sequence of such a manual operation mode.

In the present embodiment to individually perform optical zoom and digital zoom, the zoom lever SW3 is assigned with the optical zoom while the vertical and horizontal OK switch S8 is assigned with the digital zoom.

In the fourth embodiment at default the imaging device 1 is at the widest angle in both the optical zoom (35 mm equivalent focal length of 28 mm) and digital zoom (no zoom). By a user's manipulation of the zoom lever SW3, the CPU block 1043 drives the zoom motor 71b to perform optical telephoto zoom.

Then, by a user's stopping operating the zoom lever SW3 and start operating the vertical and horizontal OK switch S8, the CPU block 1043 instructs the resize codec block 1048 to perform digital zoom even if the optical zoom has not reached the telephoto end (85 mm in FIG. 16).

As described above, the imaging device 1 comprises the zoom lever SW3 as an optical zoom driver and the vertical and horizontal OK switch SW8 as a digital zoom operator which are independently operable. The zoom motor 71b as a driver moves the zoom lens 71a to perform optical zoom when instructed so by a manipulation of the zoom lever SW3. Further, the resize codec block 1048 performs digital zoom when instructed so by a manipulation of the vertical and horizontal OK switch SW8.

Thus, the imaging device 1 with both the optical zoom function and digital zoom function can independently perform digital zoom from optical zoom from an arbitrary focal length according to a user's manipulation even if a zoom lens position has not reached the telephoto end.

Although the present invention has been described in terms of exemplary embodiments, it is not limited thereto. It should be appreciated that variations or modifications may be made in the embodiments described by persons skilled in the art without departing from the scope of the present invention as defined by the following claims.

The invention claimed is:

1. An imaging device comprising:
an optical system including a zoom lens and a focus lens;
a driver to drive the zoom lens and the focus lens;
an image sensor to convert an optical image of a subject formed via the optical system into an electric signal and output the signal as an image signal;
an image processor to generate image data of the subject according to the image signal;
a digital zoom element to perform digital zoom on the basis of the image data; and
a position detector to detect a position of the zoom lens, the imaging device further comprising:
a memory in which a minimum object distance in accordance with the zoom lens position is stored;
a distance acquiring element to acquire a distance to a subject in focus;
an optical zoom driver including a zoom switch to instruct performing the optical zoom; and
a comparator to compare the minimum object distance with the subject distance and determine whether or not the subject distance has reached the minimum object distance,
wherein:
the minimum object distance is a distance which a user of the imaging device is allowed to use and is different from a distance defined by a lens performance,
the digital zoom element is configured to perform the digital zoom when the optical zoom driver issues an instruction to perform the optical zoom towards a telephoto end and when the subject distance has reached the minimum object distance even if the zoom lens position has not reached the telephoto end,
when the zoom switch is moved towards a wide angle end after the optical zoom and digital zoom are performed, the driver drives the zoom lens to perform the optical zoom towards the wide angle end first and then the digital zoom element performs digital zoom towards the wide angle end.

2. The imaging device according to claim 1, further comprising
a display to display the image data, wherein
the driver and the digital zoom element are configured to perform the optical zoom and digital zoom, respectively, so as not to change an angle of view in the image data displayed on the display when there is a change in the subject distance acquired by the distance acquiring element.

3. The imaging device according to claim 1, wherein
the driver is configured to drive the zoom lens to perform the optical zoom until the subject distance reaches the minimum object distance, upon receiving an instruction to drive the zoom lens to perform the optical zoom towards the telephoto end from the optical zoom driver when the subject distance acquired by the distance acquiring element has increased.

4. The imaging device according to claim 1, wherein
the image data is a preview image in a still image shooting or a video image in a video shooting.

5. The imaging device according to claim 1, further comprising
a digital zoom operator which is operable independently from the optical zoom driver to instruct the digital zoom element to perform digital zoom, wherein:
the driver is configured to drive the zoom lens to perform optical zoom, upon receiving an instruction from the optical zoom driver; and
the digital zoom element is configured to perform digital zoom, upon receiving an instruction from the digital zoom operator.

6. An image processing method comprising the steps of:
driving a zoom lens and a focus lens to form an optical image of a subject;
converting the optical image into an electric signal and output the signal as an image signal;
generating image data of the subject according to the image signal;
performing digital zoom on the basis of the image data;
detecting a position of the zoom lens;
the method further comprising:
storing a minimum object distance in accordance with the zoom lens position, the minimum object distance being a distance which a user of the imaging device is allowed to use and being different from a distance defined by a lens performance;
acquiring a distance to a subject in focus;
driving the zoom lens to perform an optical zoom in response to actuation of a zoon switch;
comparing the minimum object distance with the subject distance and determining whether or not the subject distance has reached the minimum object distance; and
performing the digital zoom when receiving an instruction to perform the optical zoom towards a telephoto end and when the subject distance has reached the minimum object distance even if the zoom lens position has not reached the telephoto end,
wherein upon the zoom switch moving towards a wide angle end after the optical zoom and digital zoom are performed, driving the zoom lens to perform the optical zoom towards the wide angle end first and then performing the digital zoom towards the wide angle end.

7. The image processing method according to claim 6, further comprising the step of
upon receiving an instruction to perform an optical zoom towards the telephoto end, determining whether or not a subject distance has reached a minimum object distance and performing digital zoom when the subject distance has reached the minimum object distance.

\* \* \* \* \*